Dec. 12, 1967  P. W. DILLON ET AL  3,358,067
ELECTRIC MELT VESSEL
Filed Nov. 23, 1964  2 Sheets-Sheet 2

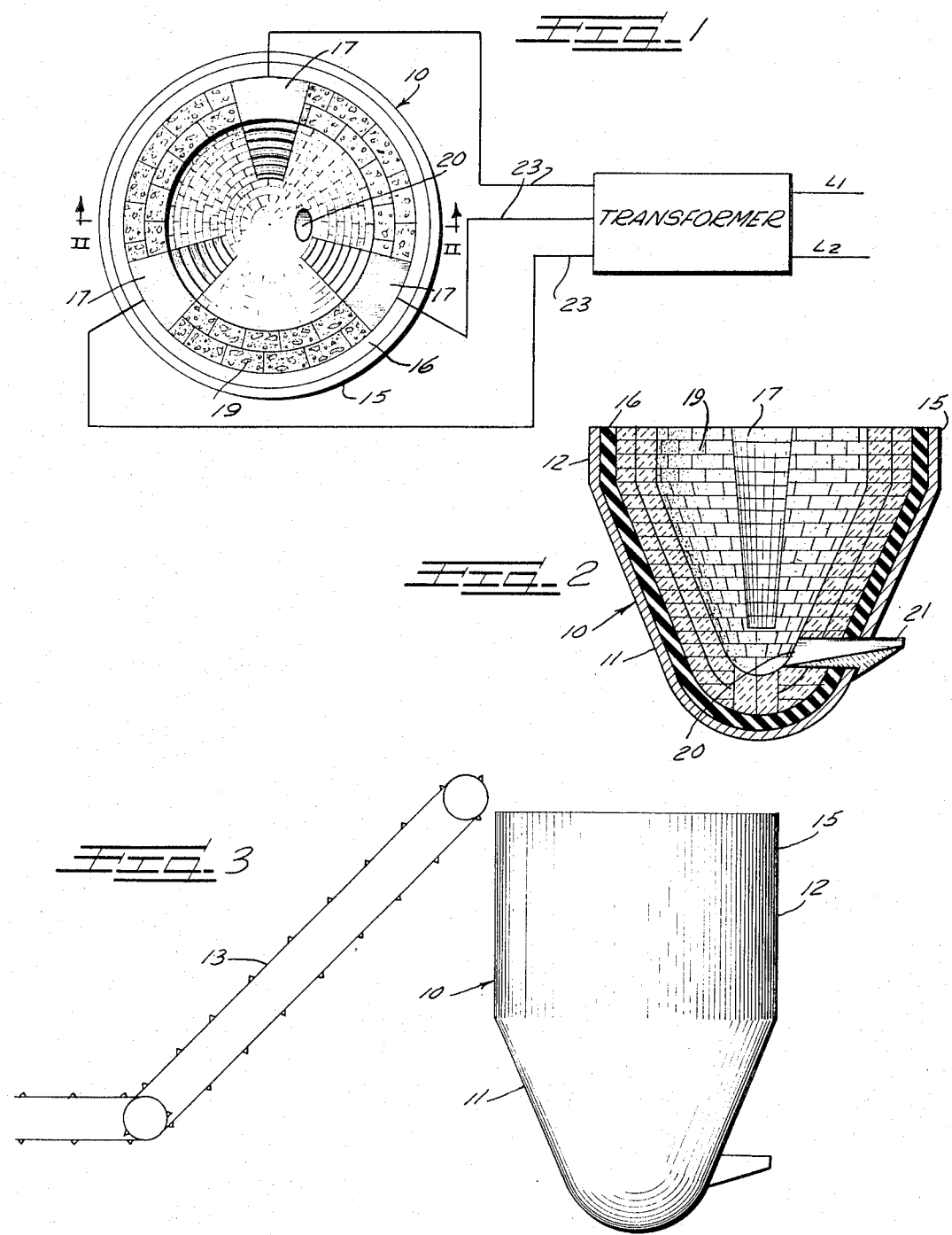

INVENTOR.
Paul W. Dillon
Charles G. Robinson
BY Hill, Sherman, Meroni, Gross, Simpson ATTORNEYS

United States Patent Office 3,358,067
Patented Dec. 12, 1967

3,358,067
ELECTRIC MELT VESSEL
Paul W. Dillon and Charles G. Robinson, Sterling, Ill., assignors to Northwestern Steel & Wire Company, Sterling, Ill., a corporation of Illinois
Filed Nov. 23, 1964, Ser. No. 413,264
6 Claims. (Cl. 13—23)

This invention relates to improvements in electric melting vessels.

A principal object of the present invention is to provide a novel and improved form of electric melting vessel arranged with a view toward utmost efficiency in the liquifying of various types.

A further object of the invention is to provide a new and improved form of electric melting vessel arranged to use the heat normally wasted on other types of melting vessels, to pre heat the incoming charge.

A still further object of the invention is to provide an improved form of electric melting vessel particularly adapted for preheating and melting scrap.

Still another object of the invention is to provide an electric melting vessel having a height, diameter, charge weight and specific resistance interaction to facilitate the electric melting of scrap and other metals.

A still further object of the invention is to provide an electric melting vessel having a bottom tapered portion terminating into a cylindrical shaft portion so arranged as to efficiently melt the scrap in the tapered bottom portion of the vessel and utilize the heat which would normally be wasted to preheat the metal in the cylindrical shaft portion of the vessel.

A still further object of the invention is to provide an electric melting vessel having a simplified and improved form of electrode structure insulated from the shell of the vessel and recessed within the refractory brick of the vessel and forming a continuation thereof extending downwardly along the wall of the vessel and energized through individual phases of a multi-phase source of power.

A still further object of the invention is to provide a melting vessel in which the usual electrodes extending downwardly into the vessel are eliminated, and electrodes consisting of current conducting blocks take the place thereof, and are recessed in the refractory lining of the furnace and form in effect a continuation of the inner periphery thereof, to provide the arc power for pre-heating and melting metals in the vessel.

Still another object of the invention is to provide an improved form of melting vessel having a converging bottom, with carbon compound blocks extending along the wall of the furnace, in which the converging furnace wall effects the pressing of the scrap or other metal against the carbon compound blocks, with an increasing contact pressure of the scrap or other metal on the blocks, in which the voltage to the blocks is regulated in accordance with the resistance of the material being melted to obtain maximum melting efficiency of various charges of various specific resistances.

A further object of the invention is to improve upon the electric furnaces heretofore in use by controlling the heat balance within the furnace, by recessing blocks made from carbon compounds in the wall of the furnace and locating the blocks in the cold spots of the furnace and energizing the blocks through a multi-phase source of current.

These and other objects of the invention will appear from time to time as the following specification proceeds and with reference to the accompanying drawings wherein:

FIGURE 1 is a top plan view of an electric melting vessel constructed in accordance with the principles of the present invention;

FIGURE 2 is a transverse sectional view taken substantially along line II—II of FIGURE 1;

FIGURE 3 is a diagrammatic view in side elevation of the furnace shown in FIGURES 1 and 2, diagrammatically illustrating a charging means for the furnace;

Figure 4:
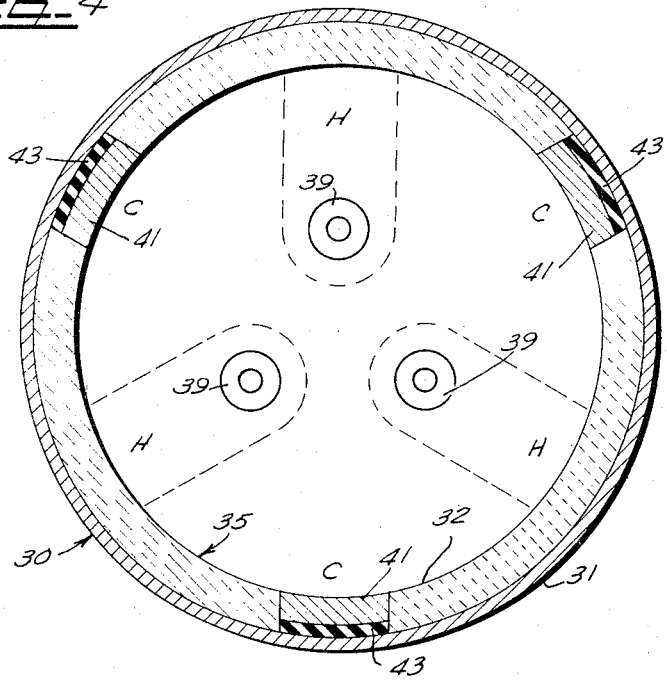
Figure 5:
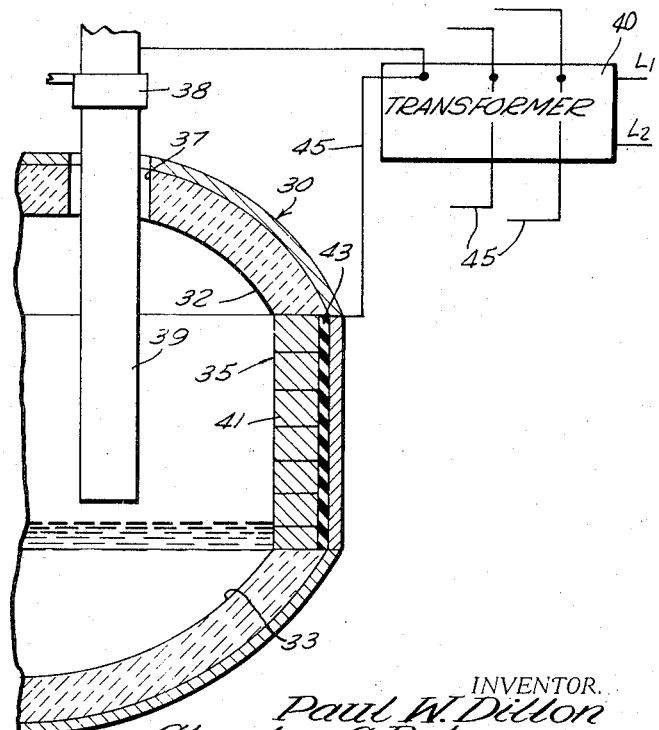

FIGURE 4 is a horizontal sectional view taken through a conventional form of three-phase electric furnace, showing the principles of the present invention applied to the furnace, to equalize the heat balance within the furnace; and FIGURE 5 is an enlarged fragmentary diagrammatic vertical sectional view taken through a conventional three-phase electric furnace, in order to further illustrate the application of the principles of the present invention to improve the heat balance within the furnace.

The principles of the present invention are applicable to various forms of vessels for melting ferrous and non-ferrous metals and are applicable to reheat furnaces, melting vessels for scrap and other metals as well as conventional three-phase electric furnaces, and are particularly applicable to melting vessels for scrap and ferrous and non-ferrous metals, but may be applied as well to improve the heat balance of conventional three-phase electric furnaces.

In FIGURES 1, 2 and 3 of the drawings we have shown an electric melt vessel 10 having a lower melting portion 11 in the general form of an inverted truncated cone and having a generally cylindrical shaft portion 12 extending upwardly therefrom.

The shaft portion 12 may be of various heights, dependent upon the use to which the vessel is to be put. The ratio between the melting portion and the shaft portion may vary in accordance with the ores to be melted. As for example, the ratio between the melting portion and the shaft portion may be substantially equal where the furnace is used for melting iron ores or fine materials, and may be much greater for a furnace constructed for melting scrap.

The greater the height of the shaft portion, the greater will be the ability of the furnace to reclaim its waste heat, as all heat will be expanded into the charge from the electrodes and any heat of combustion, which may be in the charge will flow up through the colder scrap or iron ore, depending upon the metal being melted, which will increase the efficiency of preheating the incoming charge.

In FIGURE 3 we have diagrammatically shown a charging conveyor 13 for charging the vessel in a conventional manner. It is obvious that a conveyor need not be used but that various other charging means may be used as well.

Referring now in particular to the details on the invention illustrated in FIGURES 1, 2 and 3 the melting vessel or furnace 10 is shown as having a steel shell 15 having insulation 16 extending along the inner periphery of the shell. Current conducting blocks 17 made from carbon compounds, such as carbon or graphite, extend upwardly along the insulation 16 in generally vertically extending rows, from positions close to the bottom of the vessel. The vertical rows of blocks 17 are located 120° from each other. Refractory brick 19 such as brick made from a high aluminum material, or from any other material which will stand temperatures in the order of 3,000° F. are disposed along the insulation 16 and form the refractory lining of the furnace and recess the blocks 17 therein, the outer surfaces of which blocks are shown as being flush with the inner periphery of the furnace, defined by the refractory brick.

An outlet 20 is provided in the bottom of the furnace. The outlet 20 leads to a spout 21 leading through the shell of the furnace. The spout 21 may be plugged by a clay plug in a conventional manner, which may be removed when it is desired to trap the furnace.

The blocks 17 are each connected with one phase of a multi-phase source of power, such as a conventional three-phase transformer of a type having a wide voltage range, in which the voltage may be varied by connecting leads 23 connected with the carbon compound electrodes to different taps on the transformer (not shown). The leads 23, 23 are placed in a triangular configuration to reduce the amount of reactance inherent from the transformer.

FIGURE 2 shows a transverse sectional view taken through the melting vessel and illustrates how the vessel tapers at the bottom. With this tapered construction, as the unit is filled with metal, such as scrap, the downward pressure of the melt exerts pressure against the tapered sides of the vessel, and where the carbon compound blocks extend downward toward the bottom of the vessel, the pressure of the melt presses the scrap against the carbon compound blocks and increases the contact pressure at the point of contact of the scrap with the blocks.

The diameter ratio of the bottom and top of the vessel shown in FIGURE 2 will be a function of the charge weight into the vessel, and because of the bulk density of the chargeable material, a selected angle of taper is maintained in the vessel to provide maximum melting efficiency of various charges of various specific resistances. The voltage of the adjustable voltage transformer is adjusted by connecting the leads 23 to various taps on the transformer (not shown), in accordance with the resistance of the charge. For example, with an extremely heavy charge of carbon steel plates or heavy scrap materials, the voltage will have to be somewhat lower and the current will have to be higher, because of the low resistance in the charge.

Where the charge consists of large amounts of iron ore and flux material, which has a somewhat higher specific resistance, the voltage on the vessel will have to be increased to maintain the efficiency of melting.

It may thus be seen that we have provided a new and improved melting vessel for scrap, iron ore and other metals in which the usual electrodes extending down into the vessel are despensed with an electrode in the form of current conducting blocks are instead recessed in the wall of the furnace, and have inner surfaces forming continuations of the wall.

It may further be seen that the tapered bottom of the furnace effects an increase in downward pressure of the melt against the tapered bottom and sides of the furnace and increases the contact pressure of the ore or melt against the carbon blocks, with the resultant increase melting efficiency of the furnace.

It may still further be seen that due to this increased contact pressure, the voltages may be varied for metals of different resistances and that with the shaft portion of the furnace extending above and forming a continuation of the melt portion of the furnace, the vessel has the ability to reclaim its waste heat including any heat of combustion that may be in the charge and utilize this waste heat to preheat the scrap or iron ore of the charge, as it flows upwardly through the charge.

In FIGURES 4 and 5 we have shown the principles of the invention applied to balance the unbalanced heat of a conventional three-phase electric furnace. The furnace is generally indicated by reference character 30 and is conventionally in the form of a steel bowl or shell 31 with a refractory lining such as is shown at 32. The furnace 30 has a hearth 33 which is in the form of a shallow bowl formed in the refractory of the bottom lining and has a generally cylindrical side wall 35 extending upwardly from the hearth 33 and terminating into a roof 36, apertured at 37 to form port openings through which vertical carbon or graphite electrodes 39 extend.

The electrodes 39 may be generally cylindrical columns of graphite or carbon and may be hollow or solid, such electrodes, however, usually being hollow, as shown.

Each electrode 39 is carried in a holder 38 (FIGURE 5) which may be mounted on the outside of the furnace for adjustable movement, to space the ends of the electrodes in the proper spaced relation with respect to the melt in the furnace. The holder 38 may be vertically moved by a winch and rope system, motor driven, or may be actuated by any other form of automatic electrode advancing mechanism. The holder and method of vertically moving the holder for properly positioning the electrodes 39 with respect to the charge is no part of the present invention, so need not herein be shown or described further.

The electrodes 39 are energized by a conventional electrical circuit means such as a transformer 40, which may be a three-phase transformer having a wide voltage range, as in the form of the invention illustrated in FIGURE 1. One phase of the transformer may be connected with each electrode.

In FIGURE 4 of the drawing we have generally designated the approximate geometry of the hot spot areas in the furnace and have designated these areas by reference character H. Between the areas H are cold spot areas C, particularly along the lining of the furnace. In order to balance the heat in the furnace and eliminate these cold spot areas, we have recessed current conducting blocks 41 in the refractory lining of the furnace along the cylindrical wall portion 35 thereof, and have insulated the current conducting blocks from the shell of the furnace by suitable insulation 43. The current conducting blocks 41 may be carbon or graphite blocks and may extend downwardly along the wall of the furnace to the charge and are energized through leads 45 connected thereto at their upper ends. The leads 45 each connected to a single phase of the three-phase multi-voltage transformer 40 and may be connected to the same taps as the leads connected to the electrodes 49 or to different taps in accordance with voltage requirements to equalize the heat balance within the furnace, it being understood that the leads are placed in a triangular configuration to reduce the amount of reactance inherent from the transformer.

The carbon compound blocks 41 will thus increase the heat of the charge in the cold spot areas of the furnace, and more evenly balance the heat between the hot spot areas H and the cold spot areas C, with a resultant increase in the efficiency of the furnace.

It should here be understood that the carbon blocks 41 may be energized independently of the electrodes 39, where it is desired to maintain a constant heat in the furnace and maintain the charge of the melt condition as well as to preheat the furnace prior to the energization of the electrodes 39.

While we have herein shown and described several forms in which our invention may be embodied, it may readily be understood that various modifications and variations in the invention may be attained without departing from the spirit and scope of the novel concepts thereof.

We claim as our invention:
1. In an electric arc melting vessel,
   a melting part in the general form of an inverted truncated cone,
   an outlet spout leading radially from the bottom of said melting part,
   a shaft portion extending above said melting part and forming a generally cylindrical upward continuation thereof,
   a steel shell for said melting and shaft parts,
   a refractory lining for said shell,
   insulation disposed between said lining and shell,
   carbon compound blocks spaced 120° apart, extending upwardly along said melting part from positions adjacent the bottom thereof and generally conforming to the truncated cone-like contour of said melting part, and subjected to the weight of the charge in the vessel, and a transformer having a wide voltage range supplying power to said blocks in accordance with the resistance of the material being melted and pressing against said blocks to maintain a maximum melting efficiency of the vessel.

2. In an electric melting vessel, a melting part in the general form of an inverted truncated cone, an outlet spout leading radially from the bottom of said melting part, a shaft portion extending above said melting part and forming a generally cylindrical upward continuation thereof, a steel shell for said melting and shaft parts, a refractory lining for said shell, insulation disposed between said lining and shell, carbon compound blocks spaced 120° apart extending upwardly along said melting part from positions adjacent the bottom thereof and generally conforming to the truncated cone-like contour of said melting part, and subject to the weight of the charge in the vessel, a transformer having a wide voltage range supplying power to said blocks in accordance with the resistance of the material being melted and pressing against said blocks to maintain a maximum melting efficiency of the vessel, and the shaft portion of said vessel being of a height to contain a substantial portion of the charge, and to thereby effect the preheating of the charge by the waste heat moving upwardly along said shaft portion.

3. A melting vessel in accordance with claim 2, wherein the carbon compound blocks are graphite blocks.

4. In an electric melting vessel, a lower melting part in the general form of an inverted truncated cone, an outlet spout leading radially from the bottom of said melting part, a shaft portion extending above said melting part and forming a generally upward continuation thereof, a steel shell for said melting part and shaft portion, a refractory lining for said shell, insulation disposed between said lining and shell, and rows of current conducting blocks spaced 120° apart, recessed in said refractory lining flush with the peripheral surface of said lining and insulated from said shell by said insulation, the diameter ratio of the interior of the top of said shaft portion and the bottom of said melting part being a function of the charge weight in the vessel, and the angle of taper of the melting part being selected to provide maximum contact of various charges of various specific resistances with said current conducting blocks, a transformer providing a multi-phase source of power, and electrical conductors connecting each phase of said transformer with one of said electrodes and placed in a triangular configuration to reduce the reactance inherent from the transformer, said transformer having a wide voltage range and being adjustable to accommodate the voltage to said electrodes to be varied in accordance with the resistance of the metal being melted and pressed against said electrodes by the weight of the charge and the converging configuration of the melting part of the vessel.

5. An electric melting vessel in accordance with claim 4, wherein the current conducting blocks are graphite blocks.

6. An electric melting vessel in accordance with claim 4, wherein the current conducting blocks are carbon compound blocks.

References Cited

UNITED STATES PATENTS

| | | | |
|---|---|---|---|
| 1,111,050 | 9/1914 | Wile | 13—23 |
| 1,650,675 | 11/1927 | Weed | 13—23 |
| 1,820,248 | 8/1931 | Raeder | 13—6 |
| 2,007,755 | 7/1935 | Ferguson | 13—6 |
| 2,250,155 | 7/1941 | Ferguson | 13—23 X |
| 2,283,188 | 5/1942 | Cornelius | 13—6 |

FOREIGN PATENTS

| | | |
|---|---|---|
| 89,995 | 8/1937 | Switzerland. |
| 869,245 | 2/1953 | Germany. |

RICHARD M. WOOD, Primary Examiner.

V. Y. MAYEWSKY, Assistant Examiner.